Nov. 3, 1925.  1,560,144

P. W. DAY

BOLSTER FOR RAILWAY CAR BODIES

Filed Oct. 20, 1923

Inventor

Paul W. Day

By John W. Darley

Attorney

Patented Nov. 3, 1925.

1,560,144

UNITED STATES PATENT OFFICE.

PAUL W. DAY, OF BALTIMORE, MARYLAND, ASSIGNOR, BY MESNE ASSIGNMENTS, TO HERBERT M. BRUNE, CHARLES E. SCARLETT, AND JANON FISHER, TRUSTEES, ALL OF BALTIMORE, MARYLAND.

BOLSTER FOR RAILWAY-CAR BODIES.

Application filed October 20, 1923. Serial No. 669,728.

*To all whom it may concern:*

Be it known that I, PAUL W. DAY, a citizen of the United States, residing at Baltimore, in the State of Maryland, have invented certain new and useful Improvements in Bolsters for Railway-Car Bodies; and I do hereby declare the following to be a full, clear, and exact description of the invention, such as will enable others skilled in the art to which it appertains to make and use the same.

My invention relates to bolsters for railway car bodies.

Among the objects of my invention are:—

To provide a bolster for a railway car body so constructed and arranged upon said body that it may be used with the improved railway car truck shown, described and claimed in my application for Letters Patent or railway car trucks filed August 30, 1923, Serial No. 660,122, which discloses a car truck having two side bearings 43—43 on each side of said truck.

The truck shown in the drawings of the present application is the same as that disclosed in the application above referred to, but in the present application it is to be considered as merely representative of any truck which has any plurality of bearings 43—43 on each side of said truck.

In the drawings there are shown two bearings 43—43 on each side of the truck, but these are merely representative of any plurality of bearings on each side of the truck. The car body bolster hereinafter described and claimed as being provided with two bearings near each side of the car body is to coact with the bearings 43—43 on each side of the truck for supporting the car body is merely representative of any car body bolster having any plurality of bearings located near each side of the car body.

Figure 1:
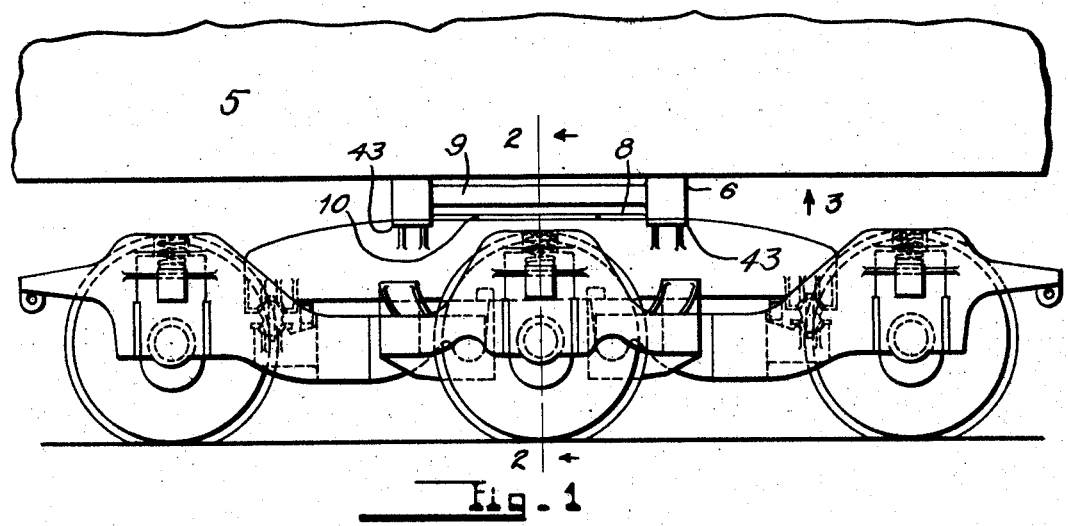
Figure 1 is a side view of a portion of a car body with my improved bolster applied thereto.
Figure 2:
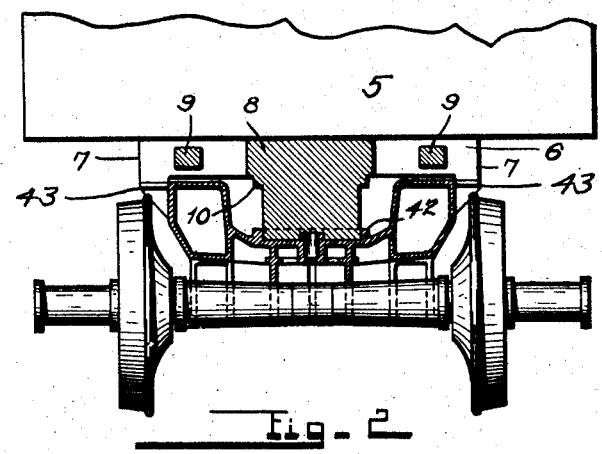
Fig. 2 is a section along the line 2—2 in Fig. 1 looking in the direction of the arrows, parts being omitted for the sake of clearness.
Figure 3:
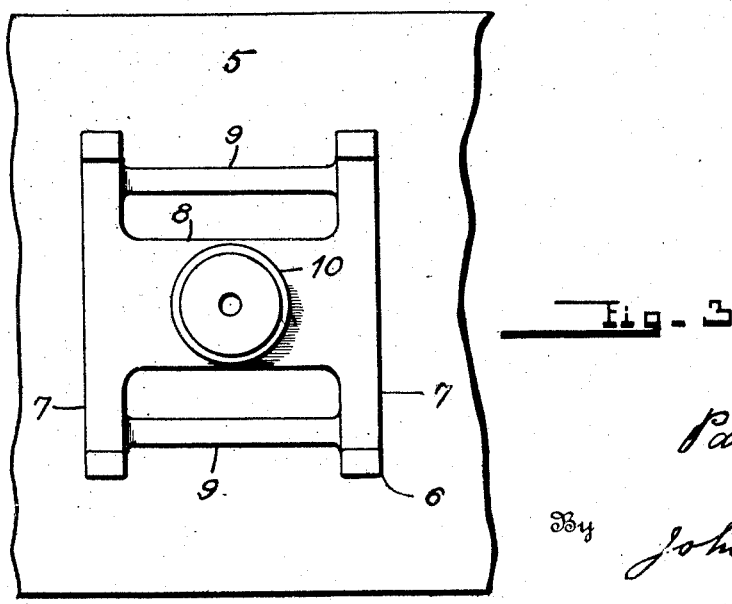
Fig. 3 is a view of the car body when viewed in the direction of the arrow 3 in Fig. 1.

The car body 5 is to be constructed in any approved manner and there is to be secured to the underside thereof a plurality of bearings on each side thereof which may be formed on a bolster 6 which is provided with members 7—7 that extend transversely of the car body and are connected together by the main truss 8 and two other trusses 9—9 which are merely representative of any desired plurality of trusses connecting the members 7—7.

The king pin 10 is secured to the main truss 8 and cooperates with the center plate 42 on the truck to pivotally connect the car body to the truck.

The bolster 6 may have all its parts integrally formed or it may be made of a plurality of parts secured together in any approved manner, but however formed, it is to comprise a plurality of bearings located near each side of the car body for coacting with a plurality of bearings on each side of the truck for supporting the load stresses and a king pin for coacting with the center plate on the truck to pivotally connect the latter to the car body.

By the use of my improved bolster, I distribute the load stresses from the car body to the truck through a plurality of bearings on each side and thus greatly reduce the stress upon each bearing; consequently, I practically eliminate wear of said bearings and prevent the buckling of the car body and fracture or deformation of the bearings which frequently occurs when there is but one side bearing on each side of said body.

I have shown one form of my improved bolster in order to illustrate the novel ideas involved, but it is to be understood that my invention is not to be limited to the exact structure shown, for many changes may be made therein without departing from the spirit of my invention.

I claim:—

1. The combination with a car body, of a bolster secured thereto and comprising a plurality of side bearings on each side thereof.

2. The combination with a car body, of a bolster secured thereto and comprising a plurality of side bearings on each side thereof and a king pin.

3. A bolster for use on a car body, said bolster comprising a plurality of members each having a plurality of side bearings thereon and trusses connecting said members.

4. A bolster for use on a car body, said bolster comprising a plurality of members each having a plurality of side bearings thereon, trusses connecting said members and a king pin.

5. A bolster for use on a car body, said bolster comprising a plurality of members each having a plurality of side bearings thereon, trusses connecting said members and a king pin on one of said trusses.

In testimony whereof, I affix my signature.

PAUL W. DAY.